United States Patent
Kessler

(10) Patent No.: US 12,424,353 B2
(45) Date of Patent: Sep. 23, 2025

(54) CONDUCTOR ASSEMBLY, IN PARTICULAR FOR USE IN ELECTRIC VEHICLES OR HYBRID VEHICLES

(71) Applicant: Robert Bosch GmbH, Stuttgart (DE)

(72) Inventor: Martin Kessler, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 201 days.

(21) Appl. No.: 18/256,258

(22) PCT Filed: Nov. 25, 2021

(86) PCT No.: PCT/EP2021/082902
§ 371 (c)(1),
(2) Date: Jun. 7, 2023

(87) PCT Pub. No.: WO2022/128378
PCT Pub. Date: Jun. 23, 2022

(65) Prior Publication Data
US 2024/0021344 A1    Jan. 18, 2024

(30) Foreign Application Priority Data

Dec. 16, 2020  (DE) .................. 10 2020 216 010.4
Aug. 18, 2021  (DE) .................. 10 2021 209 037.0

(51) Int. Cl.
*H01B 17/28*  (2006.01)
*H01B 7/00*   (2006.01)
*H01B 7/30*   (2006.01)

(52) U.S. Cl.
CPC .......... *H01B 17/28* (2013.01); *H01B 7/0018* (2013.01); *H01B 7/30* (2013.01)

(58) Field of Classification Search
CPC .................................................... H01B 17/28
(Continued)

(56) References Cited

U.S. PATENT DOCUMENTS 4,342,881 A * 8/1982 Fukuda .............. H05K 7/06
                                                  29/854
10,475,551 B2 * 11/2019 Wang .................. H01B 5/16
(Continued)

FOREIGN PATENT DOCUMENTS

DE   102008033476 A1   2/2009
DE   102013216827 A1   2/2015
DE   102016206234 A1   10/2017

OTHER PUBLICATIONS

Translation of International Search Report for Application No. PCT/EP2021/082902 dated Mar. 10, 2022 (2 pages).
(Continued)

*Primary Examiner* — Stanley Tso
(74) *Attorney, Agent, or Firm* — Michael Best & Friedrich LLP

(57) ABSTRACT

The invention relates to a conductor assembly (1), in particular for use in electric vehicles or hybrid vehicles, comprising at least one planar first current-conducting component (10) having a first outer face (12) and a first inner face (13) facing away from the first outer face (12), and comprising at least one planar second current-conducting component (20) having a second outer face (22) and a second inner face (23) facing away from the second outer face (22), wherein the second current-conducting component (20) is arranged in such a way that the second inner face (23) of the second current-conducting component (20) is opposite the first inner face (13) of the first current-conducting component (10). According to the invention, a first coating (18) is applied to the first inner face (13) of the current-conducting component (10), wherein the material of the first coating (18) has a lower electrical conductivity than the material of the first current-conducting component (10) and/or that a second coating (28) is applied to the second inner face (23) of the second current-conducting component (20), wherein
(Continued)

the material of the second coating (28) has a lower electrical conductivity than the material of the second current-conducting component (20).

10 Claims, 4 Drawing Sheets

(58) Field of Classification Search
USPC .................................................. 174/140 R
See application file for complete search history.

(56) References Cited

U.S. PATENT DOCUMENTS

2015/0340157 A1* 11/2015 Wen ..................... H01G 4/38
361/328
2021/0387679 A1* 12/2021 Koga .................. B32B 15/043

OTHER PUBLICATIONS

Beukes et al., "Busbar Design Considerations for High Power IGBT Converters," 28th Annual IEEE Power Electronics Specialists Conference, 1997, vol. 2, pp. 847-853.

* cited by examiner

CONDUCTOR ASSEMBLY, IN PARTICULAR FOR USE IN ELECTRIC VEHICLES OR HYBRID VEHICLES

BACKGROUND

The invention relates to a conductor assembly, in particular for use in electric vehicles or hybrid vehicles.

In power electronics, for example in electric vehicles or hybrid vehicles, electrical and/or electronic components carrying high electrical currents are connected to one another. Due to the high electrical currents, current-conducting elements by which the electrical and/or electronic components are connected must have correspondingly low electrical resistances and thus large cross-sections. Frequency-dependent high power dissipations occur by the repeated occurrence of switching events due to alternating currents. It is known that a significant reduction of the inductance resulting from the switching processes and thus a significantly reduced power dissipation results from planar and parallel current conduction and the magnetic interaction between current layers caused by the opposite direction of current. Thus, in such arrangements, power is supplied via current-conducting components which are configured, for example, as busbars. In this case, for example, two current-conducting components each with an opposite current direction, a forward conductor and a return conductor, are guided directly above one another and at a short distance parallel to one another.

In switching inverters and converters, DC-link capacitors are used for buffering the parasitic inductances in the system. These DC-link capacitors can comprise such current-conducting components guided in parallel and are connected to other components, such as the inverter or the power source, by means of such current-conducting components. Depending on the temperature, the required service life, and the power class, electrolyte or film capacitors are used as the DC-link capacitors. With the continuing increase in current requirements and capacitance values, capacitors are becoming increasingly larger and less resistive.

Due to the spatial expansion and the low resistive impedance fraction, undesirable resonances are formed in the DC-link capacitor. These resonances lead to an unfavorable impedance behavior of the DC-link capacitor and thus increase the electromagnetic interference emissions of the system. Further, losses result from the currents circulating in the resonance circuit in addition to the useful current, thereby increasing the temperature of the capacitor elements.

SUMMARY

According to the invention, a conductor assembly, in particular for use in electric vehicles or hybrid vehicles, is proposed. The conductor assembly comprises at least one planar first current-conducting component having a first outer face and a first inner face facing away from the first outer face. Further, the conductor assembly comprises at least one planar second current-conducting component having a second outer face and a second inner face facing away from the second outer face, wherein the second current-conducting component is arranged such that the second inner face of the second current-conducting component is opposite the first inner face of the first current-conducting component. According to the invention, a first coating is applied to the first current-conducting component on the first inner face, wherein the material of the first coating has a lower electrical conductivity than the material of the first current-conducting component and/or a second coating is applied to the second current-conducting component on the second inner face, wherein the material of the second coating has a lower electrical conductivity than the material of the second current-conducting component.

Compared to the prior art, the conductor assembly has the advantage that undesirable resonance outside the frequency range of the useful current is advantageously reduced. This can have a particularly advantageous effect, for example, on a DC-link capacitor comprising a conductor assembly according to the invention, or electrically connected to other electrical and/or electronic components by means of a conductor assembly according to the invention. The attenuation of the undesirable resonances is achieved by the fact that the resistance of the conductor assembly is highly frequency-dependent. The resistance in the conductor assembly is lower in the frequency range with significant spectral components of the useful current, for example in the frequency range less than 1 MHz, than in the frequency range of undesired resonances, for example in the frequency range greater than 1 MHz, and in particular greater than 10 MHz. This strong frequency dependence is caused by the coatings on the inner faces of the current-conducting components having a lower conductivity than the current-conducting components. The first conductor guide component and the second conductor guide component are guided very closely together, for example in the DC-link capacitor, in order to minimize parasitic inductance. As a result, in the relevant frequency range, the power distribution in the current-conducting components is determined solely by the skin effect and proximity effect. As frequency increases, this leads to an increasing shift of the current density to the inner faces of the current-conducting components and to the coatings of the current-conducting components. The current of higher undesirable frequencies is thus stronger in the coatings of the current-conducting components, which have a higher electrical resistance than the current-conducting components themselves. Thus, the higher undesirable frequencies are advantageously attenuated.

Thus, undesirable resonances are also reduced by the conductor assembly, for example in the DC-link capacitor. By reducing the undesired resonances, the impedance behavior of the DC-link capacitor is improved. This improved impedance behavior leads to lower electromagnetic interference emissions by increasing the filtering effect.

Furthermore, for example, the currents circulating in the resonance circuit are advantageously reduced in addition to the useful current in the DC-link capacitor, and thus losses in the DC-link capacitor are reduced in the form of an increase in the temperature in the capacitor elements, for example in the capacitor winding.

According to an advantageous embodiment example, it is provided that the first coating extends in a planar fashion on the first inner face of the first current-conducting component and/or the second coating extends in a planar fashion on the second inner face of the second current-conducting component. With coatings configured in this way, the undesired resonances are in particular advantageously attenuated in the frequency range higher than 1 MHz, in particular higher than 10 MHz.

According to an advantageous embodiment example, it is provided that the first coating and the second coating have the same thickness. With coatings configured in this way, the undesirable resonances are in particular advantageously attenuated in the frequency range higher than 1 MHz, in particular higher than 10 MHz.

According to an advantageous embodiment example, it is provided that the material of the first coating has an electrical conductivity that is less by at least a factor of two, in particular by a factor of five, than the material of the first current-conducting component and/or the material of the second coating has an electrical conductivity that is less by at least a factor of two, in particular by a factor of five, than the material of the second current-conducting component. Furthermore, the material of the first coating can also have an electrical conductivity that is less by at least a factor of seven, in particular by a factor of forty, than the material of the first current-conducting component and/or the material of the second coating can have an electrical conductivity that is less by at least a factor of seven, in particular by a factor of forty, than the material of the second current-conducting component. By means of a conductor assembly configured in this way, the undesirable resonances in the frequency range higher than 1 MHz, in particular higher than 10 MHz, are in particular advantageously attenuated, while the spectral components of the useful current in the frequency range less than 1 MHz experience little attenuation through the induction assembly.

According to an advantageous embodiment example, it is provided that the first coating is configured as a tin plating or as a chrome plating or as a stainless steel coating and/or the second coating is configured as a tin plating or as a chrome plating or as a stainless steel coating. Coatings formed in this way are in particular suitable for attenuating the undesirably high frequencies due to their comparatively high resistance.

According to an advantageous embodiment example, it is provided that the first current-conducting component is formed from copper and/or the second current-conducting component is formed from copper. Copper has a low electrical resistance and can thus conduct the useful current advantageously well.

According to an advantageous embodiment example, it is provided that the first current-conducting component and the second current-conducting component are plane-parallel to one another and/or the first coating and the second coating are plane-parallel to one another. With current-conducting components and coatings arranged in this way, the undesirable frequencies are in particular advantageously filtered, because this achieves a current distribution that is advantageous for filtering due to the coatings by the skin effect and proximity effect in the current-conducting components and the coating.

According to an advantageous embodiment example, it is provided that the first coating is spaced apart from the second coating by a gap, wherein the first coating is electrically insulated from the second coating by the gap.

According to an advantageous embodiment example, it is provided that the first current-conducting component and the second current-conducting component have the same width.

According to an advantageous embodiment example, it is provided that the first current-conducting component is configured as a busbar and/or the second current-conducting component is configured as a busbar. A busbar is also called a power bus. In the context of the present application, a busbar is understood to mean an electrically conductive laminar conductor, for example an electrically conductive bar or strip. If the current-conducting components are configured as busbars, they can be guided in the opposite direction of current as a forward conductor and a return conductor directly above one another and at a short distance parallel to one another.

A capacitor, in particular a DC-link capacitor, comprising a conductor assembly according to the invention is further advantageous.

BRIEF DESCRIPTION OF THE DRAWINGS

An embodiment example of the invention is shown in the drawing and explained in further detail in the following description. The figures show.

DETAILED DESCRIPTION

Figure 1:
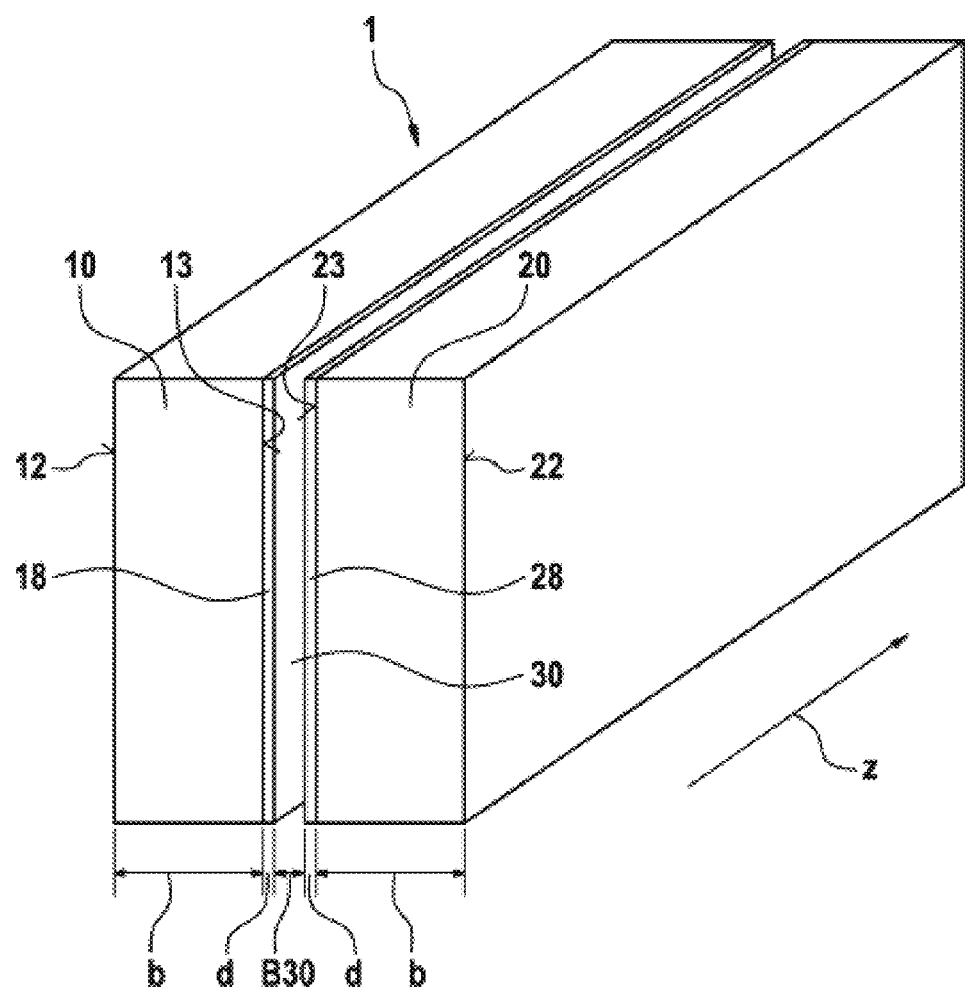
FIG. 1 a schematic representation of an embodiment example of the conductor assembly according to the invention, FIG. 2 distribution of the current density at a frequency of 1 MHz in the embodiment example of the conductor assembly, FIG. 3 distribution of the current density at a frequency of 100 MHz in the embodiment example of the conductor assembly, FIG. 4 illustration of the frequency dependency of the resistance of the conductor assembly.

FIG. 1 shows a schematic illustration of an embodiment example of a conductor assembly 1. For example, the conductor assembly 1 can be used in systems that carry high currents, for example in power electronics, for example in electric vehicles or hybrid vehicles.

In particular, the conductor assembly 1 can be part of an electrical and/or electronic component, in particular a DC-link capacitor. The conductor assembly 1 can be used in order to connect an electrical and/or electronic component to another electrical and/or electronic component. The electrical and/or electronic components can be or can include, for example, inverters, converters, DC/DC converters, capacitors, for example DC-link capacitors, batteries, electric machines, or, for example, other electronic and/or electrical components that are used, for example, in electric vehicles or hybrid vehicles.

As shown in FIG. 1, the conductor assembly 1 comprises a first current-conducting component 10 and a second current-conducting component 20. For example, the current-conducting components 10, 20 can be bent or curved or can also run in a curved or incremental fashion. The current-conducting components 10, 20 are made of an electrically conductive material, for example a metal, for example copper. In FIG. 1, a portion of current-conducting components 10, 20 is shown. In FIG. 1, the current-conducting components 10, 20 extend along a longitudinal direction z. The current-conducting components 10, 20 are each formed in a planar fashion. The current-conducting components 10, 20 run plane-parallel to one another in the z-direction. In this embodiment example, the first current-conducting component 10 and the second current-conducting component 20 are each configured as a busbar. A busbar is also called a power bus. In the context of the present application, a busbar is understood to mean an electrically conductive laminar conductor, for example an electrically conductive bar or strip. The current-conducting components 10, 20 configured as busbars are guided, for example, in the opposite direction of current, as the forward conductor and the return conductor, directly above one another and at a short distance parallel to one another. FIG. 1 shows a perspective view of an excerpt of the current-conducting components 10, 20 formed as busbars. Each of the current-conducting components 10, 20 in the region shown has a uniform, rectangular cross-section in this embodiment example, via a longitudinal extension in the z-direction of the current-conducting components 10, 20. The first current-conducting component 10 has the same cross-section as the second current-conducting component 20. However, the current-conducting components 10, 20 can also be surfaces on a capacitor winding, for example. For example, the first current-conducting component 10 can be configured as a busbar and the second current-conducting component 20 can be configured as a surface on a capacitor winding. However, the current-conducting components 10, 20 can also be other electrically conductive surfaces in and/or at a DC-link capacitor.

The first current-conducting component 10 comprises a first inner face 13 and a first outer face 12. The first inner face 13 of the first current-conducting component 10 faces away from the first outer face 12 of the first current-conducting component 10. The first inner face 13 and the first outer face 12 form the largest surfaces of the first current-conducting component 10. In this embodiment example, the first inner face 13 of the first current-conducting component 10 is configured plane-parallel to the first outer face 12 of the first current-conducting component 10. The second current-conducting component 20 comprises a second inner face 23 and a second outer face 22. The second inner face 23 of the second current-conducting component 20 faces away from the second outer face 22 of the second current-conducting component 20. The second inner face 23 and the second outer face 22 form the largest surfaces of the second current-conducting component 20. In this embodiment example, the second inner face 23 of the second current-conducting component 20 is configured plane-parallel to the second outer face 22 of the second current-conducting component 20. The inner faces 13, 23 of the two current-conducting components 10, 20 face one another. Accordingly, the outer faces 12, 22 of the two current-conducting components 10, 20 face away from one another. In this embodiment example, the inner faces 13, 23 of the two current-conducting components 10, 12 are arranged plane-parallel to one another. Furthermore, in this embodiment example, the outer faces 12, 22 of the two current-conducting components 10, 12 are arranged plane-parallel to one another. The current-conducting components 10, 20 each have a width b. The width b is measured perpendicular to the inner faces 13, 23. In this embodiment example, the first current-conducting component 10 has the same width b as the second current-conducting component 20. For example, the width b of the current-conducting components 10, 20 can be between 0.5 mm and 2 mm, in particular between 0.7 mm and 1.5 mm, in particular between 0.9 mm and 1.1 mm. However, the current-conducting components 10, 20 can also have other widths b.

The current-conducting components 10, 20 are configured so as to conduct high alternating electrical currents. The current-conducting components 10, 20 are made of an electrically conductive material, for example a metal, in particular copper. The current-conducting components 10, 20 are arranged plane-parallel to one another. The inner faces 13, 23 of the current-conducting components 10, 20 are spaced apart by a gap 30. The parasitic inductance of the conductor assembly 1 is reduced by guiding the current-conducting components 10, 20 at a small distance from one another in a plane-parallel manner. The first current-conducting component 10 conducts a current in a forward direction. The second current-conducting component 20 conducts a current in a return direction opposite to forward direction. The direction of current in the two current-conducting components 10, 20 is thus opposite and alternated by the AC current. The current flows along the direction of the longitudinal extension of the current-conducting components 10, 20. Thus, in the current-conducting components 10, 20 shown in FIG. 1, the current flows in the first current-conducting component 10 in the z-direction and in the second current-conducting component 20 opposite the z-direction. After changing the direction of current in AC power, the current flows in the first current-conducting component 10 in the opposite direction to the z-direction and in the second current-conducting component 20 in the z-direction.

Furthermore, the conductor assembly 1 shown in FIG. 1 comprises a first coating 18, with which the first current-conducting component 10 is coated, and a second coating 28 with which the second current-conducting component 20 is coated. The first coating 18 is in direct electrically conductive contact with and can adhere to the first current-conducting component 10, for example in a material-locking manner. The second coating 28 is in direct electrical contact with and can adhere to the second current-conducting component 20, for example in a material-locking manner. The coatings 18, 28 are arranged on the inner faces 13, 23 of the current-conducting components 10, 20 on the current-conducting components 10, 20, respectively. In this embodiment example, the first coating 18 completely covers the first inner face 13 of the first current-conducting component 10. Furthermore, in this embodiment example, the second coating 28 completely covers the second inner face 23 of the second current-conducting component 20. The coatings 18, 28 each have a thickness d of the coating 18, 28. In this embodiment example, the first coating 18 of the first current-conducting component 10 has the same thickness d as the second coating 28 of the second current-conducting component 20. The thickness d of the coatings 18, 28 is constant over the surface extent of the coating. For example, the first coating 18 and/or the second coating 28 can have a thickness d of between 0.01 mm and 0.2 mm, in particular of between 0.03 mm and 0.1 mm. However, the coatings 18, 28 can also have other thicknesses d. The coatings 18, 28 are provided on the current-conducting components 10, 20 in the region where the first current-conducting component 10 and the second current-conducting component 20 overlap. An object in the context of the present application is understood to be the first current-conducting component 10, the second current-conducting component 20, the first coating 18, or the second coating 28. When a first object overlaps with a second object, the first object and the second object are arranged relative to one another such that a perpendicular projection of the first object onto a projection plane arranged plane-parallel to the second object and a perpendicular projection of the second object onto the projection plane have at least one intersection.

The first coating 18 has a lower electrical conductivity than the first current-conducting component 10. The first coating 18 thus has a higher electrical resistance than the first current-conducting component 10. At the same time, the second coating 28 has a lower electrical conductivity than the second current-conducting component 20. The second coating 28 thus has a higher electrical resistance than the second current-conducting component 20. For example, the coatings 18, 28 on the current-conducting components 10, 20 can be formed from tin, chromium, or stainless steel. The current-conducting components 10, 20 having the respective coatings 18, 28 are spaced apart from one another by a gap 30 and are electrically insulated from one another. The gap 30 extends between the coatings 18, 28 of the current-conducting components 10, 20. The gap 30 has a width B30 measured perpendicular to the inner faces 13, 23 of the current-conducting components 10, 20 and or perpendicular to the coatings 18, 28. In this embodiment example, the gap 30 has a width B30 of the gap that is less than the width b of the current-conducting components 10, 20. In this embodiment example, the gap 30 has a width B30 of the gap 30 that is greater than the thickness d of the coatings 18, 28. For example, the gap 30 can have a width B30 greater than 0.05 mm and/or less than 0.3 mm, in particular greater than 0.1 mm and less than 0.25 mm. However, the gap can be equal to or greater than 0.3 mm, depending on the voltage situation of the system. Coatings spaced apart in this way lead to an advantageous reduction of parasitic inductance in the conductor assembly 1. At the same time, this ensures that sufficient interaction between the opposing currents in the two current-conducting components 10, 20 due to the proximity effect results in the current density being shifted towards the coatings 18, 28 on the inner faces 13, 23 of the current-conducting components 10, 20.

Figure 2:
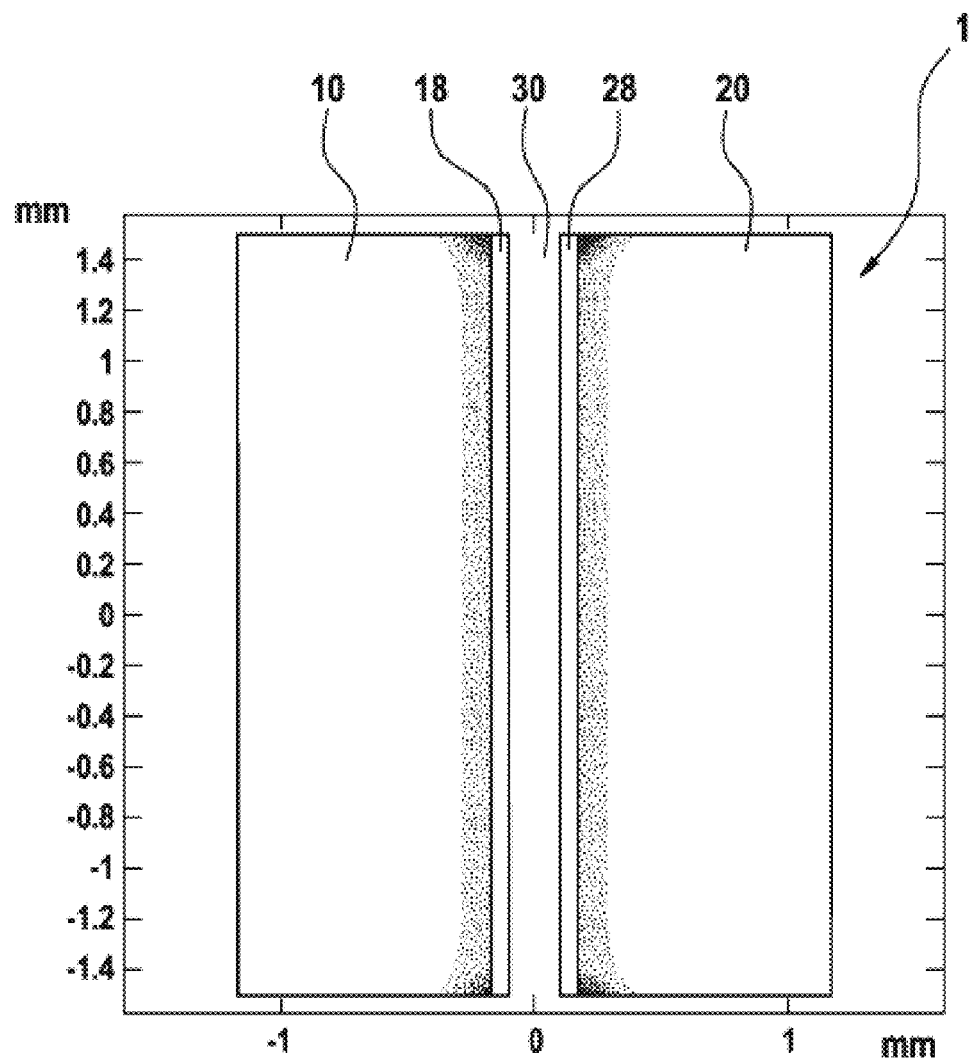
Figure 3:
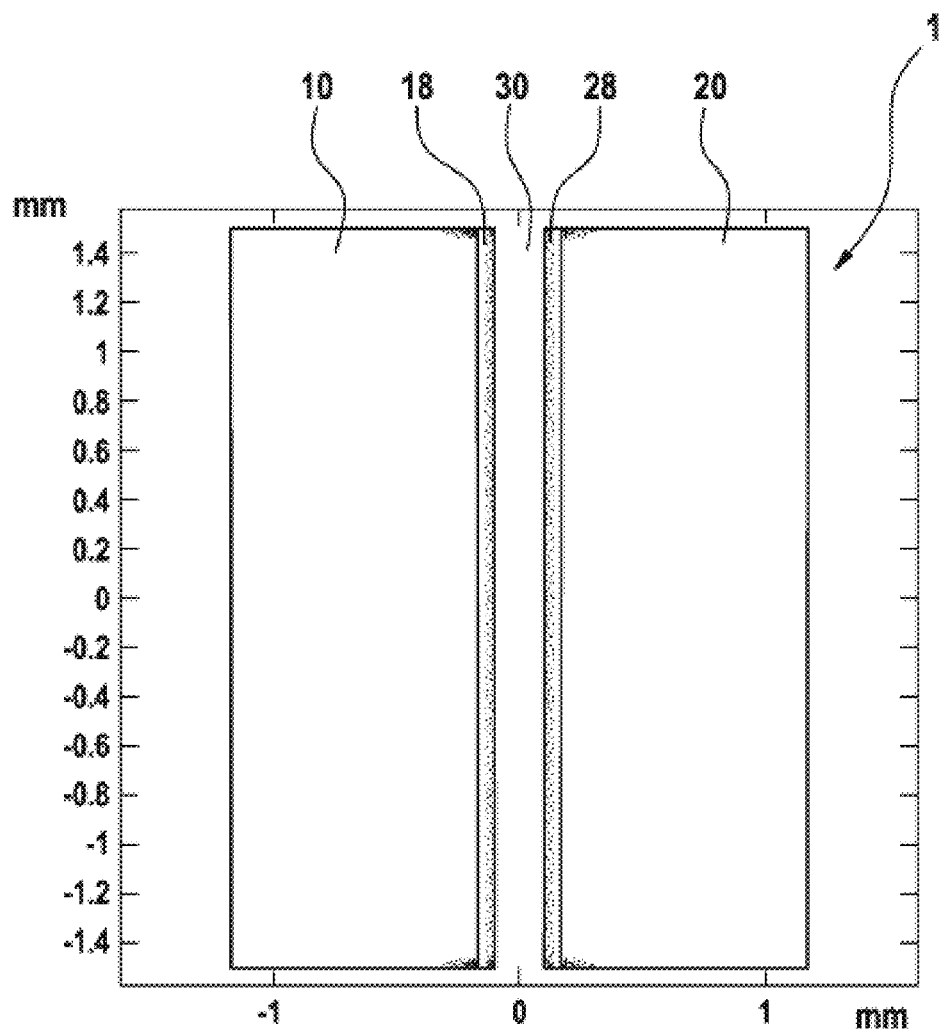

With the coatings 18, 28 of the current-conducting components 10, 20, it is achieved that the resistance of the conductor assembly 1 is highly frequency-dependent. Because the first current-conducting component 10 and the second current-conducting component 20 and the busbars of the forward and return conductors are guided very closely to one another in order to minimize the parasitic inductance of the conductor assembly 1, the current distribution in the current-conducting components 10, 20 is exclusively determined by the skin effect and proximity effect in the relevant frequency range. This leads to a greater shifting of the current density to the inner faces 13, 23 of the current-conducting components 10, 23 as the frequency increases. This is shown in FIGS. 2 and 3. FIG. 2 shows the distribution of current density at a frequency of 1 MHz in the conductor assembly 1 in a cross-section perpendicular to the z-direction. At this frequency in the useful current range, the coatings 18, 28 are hardly used for the current conduction through the conductor assembly 1. Thus, in the useful current range, the losses from the coatings 18, 28 are hardly increased compared to current-conducting components without coatings. FIG. 3 shows the distribution of the current density at a frequency of 100 MHz, in the range of the undesirable frequencies, in the conductor assembly 1 in cross-section perpendicular to the z-direction. In this frequency range, the current density shifts towards the coatings 18,28. The current conduction occurs almost exclusively in the coatings 18, 28 of the current-conducting components 10, 20 and not in the current-conducting components 10, 20 themselves. In the coatings 18, 28, the electrical resistance is greatly increased and thus high losses occur in this frequency range. This frequency range is thus attenuated by the conductor assembly 1.

Figure 4:
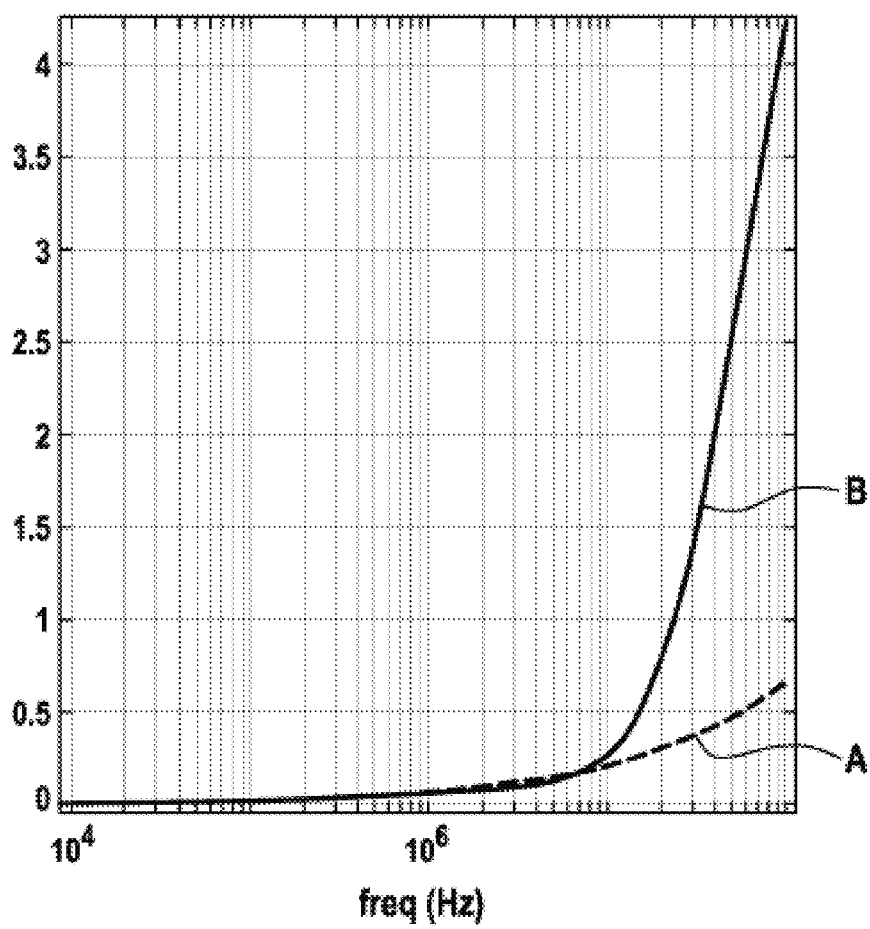

FIG. 4 shows the frequency dependence of the resistance of the conductor assembly 1. Two different curves are shown in FIG. 4. Curve A shows the resistance dependence of a conductor assembly consisting of two current-conducting components guided in parallel without coatings from the prior art. The resistance of the conductor assembly is only slightly frequency-dependent. Curve B shows the frequency dependence of the resistance in the embodiment example of the conductor assembly 1 according to the invention from FIG. 1 to FIG. 3. As becomes clear from the comparison of curve A (current-conducting components without coating) and curve B (current-conducting components with coating) in the frequency range greater than 1 MHz, in particular greater than 10 MHz, the resistance of the conductor assembly 1 is increased greatly. Thus, undesirable resonances are strongly attenuated by the coatings 18, 28 in this frequency range. The resistance in the useful current range, on the other hand, hardly changes. Thus, the undesirable frequencies are filtered through the conductor assembly 1.

Of course, further embodiment examples and mixed forms of the illustrated embodiment example are also possible.

The invention claimed is:

1. A capacitor for use in electric vehicles or hybrid vehicles, comprising a conductor assembly (1) including at least one planar first current-conducting component (10) having a first outer face (12) and a first inner face (13) facing away from the first outer face (12), and comprising at least one planar second current-conducting component (20) having a second outer face (22) and a second inner face (23) facing away from the second outer face (22),
wherein the second current-conducting component (20) is arranged in such a way that the second inner face (23) of the second current-conducting component (20) is opposite the first inner face (13) of the first current-conducting component (10),
wherein a first coating (18) is applied to the first inner face (13) of the current-conducting component (10), wherein the material of the first coating (18) has a lower electrical conductivity than the material of the first current-conducting component (10),
wherein a second coating (28) is applied to the second inner face (23) of the second current-conducting component (20), wherein the material of the second coating (28) has a lower electrical conductivity than the material of the second current-conducting component (20),
wherein the first coating (18) is spaced apart from the second coating (28) by a gap (30), wherein the first coating (18) is electrically insulated from the second coating (28) by the gap (30),
wherein the gap (30) is an opening between the first coating (18) and the second coating (28),
and the gap (30) has a width that is greater than a thickness of the first coating (18) and the second coating (28),
wherein the first current-conducting component (10) is configured as a busbar and the second current-conducting component (20) is configured as a busbar.

2. The capacitor according to claim 1, wherein the first coating (18) extends in a planar fashion on the first inner face (13) of the first current-conducting component (10) and/or the second coating (28) extends in a planar fashion on the second inner face (23) of the second current-conducting component (20).

3. The capacitor according to claim 1, wherein the first coating (18) and the second coating (28) have the same thickness (d).

4. The capacitor according to claim 1, wherein the material of the first coating (18) has an electrical conductivity that is less by at least a factor of two than the material of the first current-conducting component (10) and/or the material of the second coating (28) has an electrical conductivity that is less by at least a factor of two than the material of the second current-conducting component (20).

5. The capacitor according to claim 1, wherein the first coating (18) and/or the second coating (28) is configured as a tin plating or as a chrome plating or as a stainless steel coating and/or the second coating (28) is configured as a tin plating or as a chrome plating or as a stainless steel coating.

6. The capacitor according to claim 1, wherein the first current-conducting component (10) is formed from copper and/or the second current-conducting component (20) is formed from copper.

7. The capacitor according to claim 1, wherein the first current-conducting component (10) and the second current-conducting component (20) are plane-parallel to one another and/or the first coating (18) and the second coating (28) are plane-parallel to one another.

8. The capacitor according to claim 1, wherein the first current-conducting component (10) and the second current-conducting component (20) have the same width (b).

9. The capacitor according to claim 1, wherein the first current-conducting components (10, 20) are configured as busbars having opposing directions of current, respectively as a conductor selector from the group consisting of: a forward conductor and a return conductor, and at a distance parallel to one another based on the gap (30).

10. The capacitor according to claim 1, wherein the gap (30) has a width that is less than a width of the first current-conducting component (10) and the second current-conducting component (20).

* * * * *